M. DAVIDSON.
COFFEE POT.
APPLICATION FILED JAN. 22, 1909.

929,754.

Patented Aug. 3, 1909.

Witnesses
James F. Cryon
Fannie Jacobs

Inventor
Morris Davidson
By Watson E. Coleman
Attorney

UNITED STATES PATENT OFFICE.

MORRIS DAVIDSON, OF CAMBRIDGE, MASSACHUSETTS.

COFFEE-POT.

No. 929,754.  Specification of Letters Patent.  Patented Aug. 3, 1909.

Application filed January 22, 1909. Serial No. 473,650.

*To all whom it may concern:*

Be it known that I, MORRIS DAVIDSON, a citizen of the United States, residing at Cambridge, in the county of Suffolk and State of Massachusetts, have invented certain new and useful Improvements in Coffee-Pots, of which the following is a specification, reference being had to the accompanying drawings.

This invention relates to improvements in coffee percolators and is particularly designed to increase the efficiency of devices in current use and to provide a percolator of strong and simple construction.

One of the objects of the invention is the production of a coffee percolator having its parts so arranged that the same may be quickly cleaned when desired and which is adapted to give efficient service.

Figure 1:
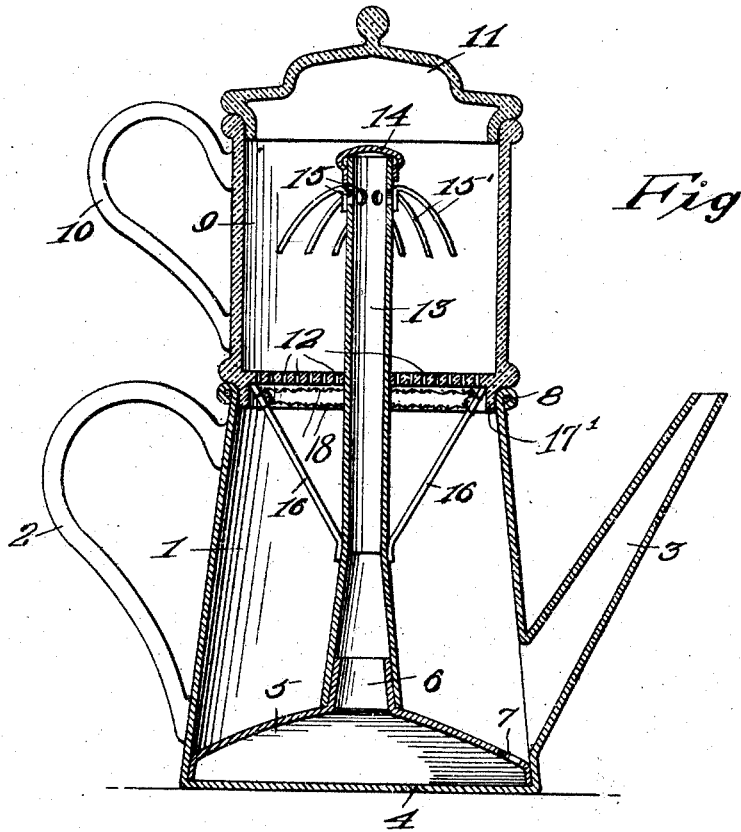
Figure 2:
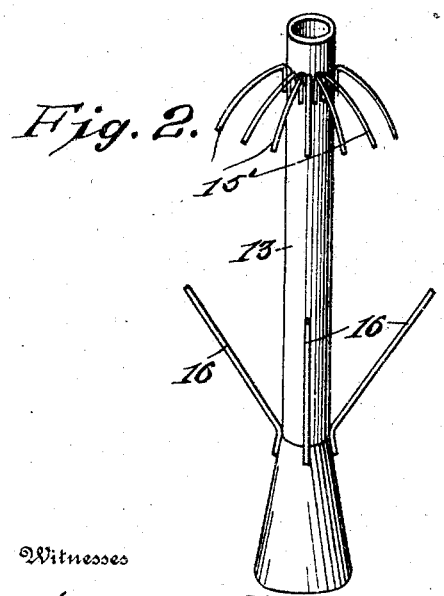
Figure 3:
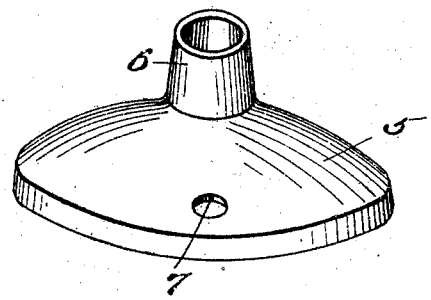

With the above and other objects in view this invention comprises certain constructions, combinations and arrangements of parts described in the following specification and illustrated in the accompanying drawings, in which:

Figure 1 is a vertical sectional view, Fig. 2 is a detail perspective view of a spray member, and, Fig. 3 is a detail perspective view of an inner receptacle.

Referring to the accompanying drawings numeral 1 denotes a main receptacle which is provided with a handle 2, and formed with a spout 3, in the conventional manner. Located on the bottom 4 of the receptacle 1 is an inner receptacle 5 which is formed with an upwardly projecting hollow cone-shaped head 6 and a port 7 through which water or other fluid in the receptacle 1 is adapted to flow into the inner receptacle 5. The upper edge of the receptacle 1 is preferably formed with a rim 8 and a percolator 9, formed of glass or other material, is suitably positioned on the rim 8. The percolator 9 is provided with a handle 10 and a removable cover 11 and has its bottom 12 formed with a series of small openings. Extending vertically through the bottom 12 is a conducting tube 13 which is closed at its upper end by a cap 14 and formed with lateral ports 15, located near said upper end, and with deflecting hoods or spray members 15′ which are positioned over the openings or ports 15 so as to deflect water rising in the tube evenly over the bottom 12 of the percolator. The lower end of the tube 13 is formed funnel shaped and is adapted to fit closely over the cone-shaped head 6 of the inner receptacle 5, and said tube is effectively braced against lateral displacement by braces 16 which are secured thereon and connected at their upper ends to the lower side of the bottom 12 of the percolator. In order to securely hold the percolator 9 on the receptacle 1, a flange 17′ is formed on the lower portion of the same.

In using my improved percolator for the production of a coffee drink the receptacle 1 is filled with a proper amount of water and the percolator 9 is provided with a suitable quantity of coffee, and the device placed over a stove or heater. The water of the receptacle 1 will flow into the inner receptacle 5 and as the water contained therein will become heated more rapidly than the balance of the water the same will rise in the cone-shaped head 6 and the tube 13, and pass into the percolator, after being sprayed or deflected therein by the hoods 15′, so as to completely saturate the coffee. The liquid passes back into the main receptacle 1 through the perforations 12 in the bottom of the percolator 9. When it is desired to effect a perfect filtration of the coffee drink a sack or textile filter 18 may be secured around the braces 16.

It is obvious that the percolator 9 may be readily removed from the main receptacle 1 without any difficulty, and when removed may be readily returned to its normal position thereon. The inner receptacle 5 is adapted to hold the water entering through the port 7, which port is located on the receptacle 5 below the plane of the upper end of the cone head 6, so that said water will, when sufficiently heated, flow upwardly through the tube 13 into the percolator, thereby establishing a circulation within the main receptacle.

Having described my invention, I claim:

The hereindescribed coffee pot comprising a main receptacle having a spout and a handle, a percolator body removably arranged on the open top of the receptacle and having a perforated bottom and a handle, a removable cover for said body, a cone-shaped inner receptacle arranged upon the bottom of the main receptacle and having adjacent to one edge a liquid inlet opening and at its center an integral upwardly projecting cone-shaped head, a tube projecting through the center of the perforated bottom of the percolator body and fixed therein, the lower end of said tube having a cone-shaped portion to receive the reduced cone-shaped head on said inner receptacle, the upper end of said tube having an annular series of discharge openings, a cap arranged upon the upper end of said tube above said openings, spray members consisting of wires having vertically disposed inner ends secured over said discharge openings in the tube and having their outer ends inclined downwardly and outwardly, and diagonal braces between the lower portion of said tube and the perforated bottom of the percolator body, said braces being adapted to support a textile filtering sack beneath the perforated bottom of the percolator.

In testimony whereof I hereunto affix my signature in the presence of two witnesses.

MORRIS DAVIDSON.

Witnesses:
 MARK STONE,
 LILLIAN P. HARRIS.